United States Patent
Ninomiya

(10) Patent No.: US 8,896,746 B2
(45) Date of Patent: Nov. 25, 2014

(54) DRIVING CIRCUIT AND METHOD FOR VOICE COIL MOTOR WITH SPRING RETURN

(75) Inventor: Tatsuya Ninomiya, Kyoto (JP)

(73) Assignee: Rohm Co., Ltd. (JP)

( * ) Notice: Subject to any disclaimer, the term of this patent is extended or adjusted under 35 U.S.C. 154(b) by 661 days.

(21) Appl. No.: 13/206,665

(22) Filed: Aug. 10, 2011

(65) Prior Publication Data

US 2012/0200763 A1 Aug. 9, 2012

(30) Foreign Application Priority Data

Aug. 12, 2010 (JP) ................................. 2010-181063

(51) Int. Cl.
*H04N 5/232* (2006.01)
*H02P 25/02* (2006.01)

(52) U.S. Cl.
CPC .................................... *H02P 25/028* (2013.01)
USPC ..................... 348/345; 348/208.1; 348/208.2; 348/208.4

(58) Field of Classification Search
USPC ............................. 348/218, 208.2, 208.4, 345
See application file for complete search history.

(56) References Cited

U.S. PATENT DOCUMENTS

2011/0158461 A1* 6/2011 Ko et al. ....................... 381/400

FOREIGN PATENT DOCUMENTS

| JP | 9-298430 A | 11/1997 |
| JP | 2008-43171 A | 2/2008 |
| JP | 2008-113506 A | 5/2008 |

* cited by examiner

*Primary Examiner* — Usman Khan
(74) *Attorney, Agent, or Firm* — Cantor Colburn LLP

(57) ABSTRACT

A driving circuit drives a voice coil motor having a spring return mechanism. A driving current generating unit supplies, to a coil of the voice coil motor, a driving current that corresponds to an analog control signal. Waveform memory stores digital waveform data which indicates the time waveform of a driving current to be supplied to the voice coil motor. A predetermined frequency component is removed from the frequency components of the waveform data. A control unit reads out the waveform data from the waveform memory at a rate that corresponds to the resonance frequency of the voice coil motor, and outputs the waveform data thus read out as a digital code. A D/A converter converts a digital code into an analog control signal, and outputs the analog control signal to the driving current generating unit.

13 Claims, 4 Drawing Sheets

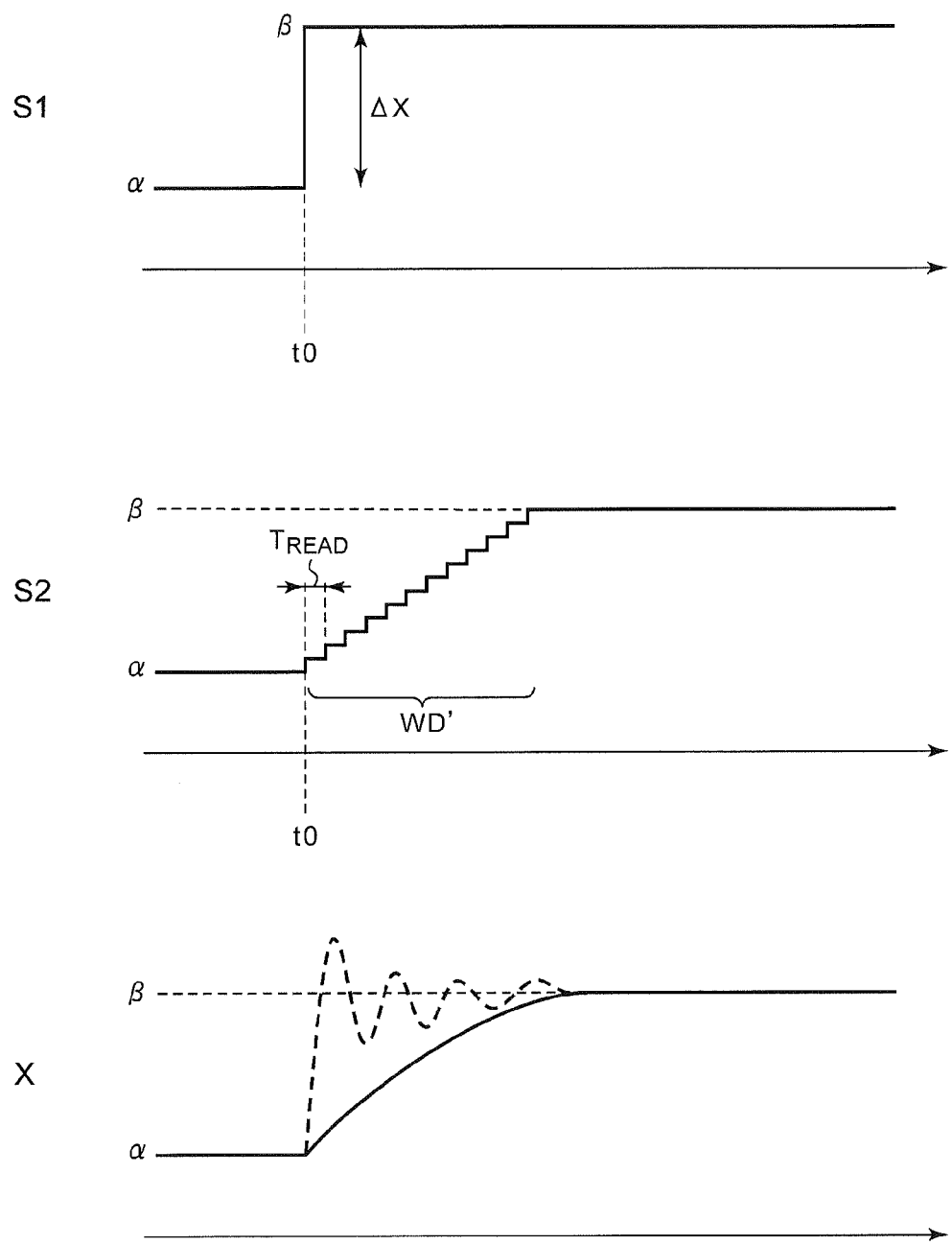

DRIVING CIRCUIT AND METHOD FOR VOICE COIL MOTOR WITH SPRING RETURN

BACKGROUND OF THE INVENTION

1. Field of the Invention

The present invention relates to a control technique for a voice coil motor having a spring return mechanism.

2. Description of the Related Art

Digital still cameras, digital video cameras, or electronic devices (e.g., cellular phones) having an image sensing function include an actuator configured to perform positioning of a focusing lens. Known examples of such actuators include actuators using a stepping motor method, actuators using a piezoelectric method, and actuators using a voice coil motor (VCM) method.

A VCM is capable of generating driving power in a linear direction that corresponds to the direction of a current that flows through its coil. For example, in a case in which an H-bridge circuit is connected to such a VCM, such an arrangement is capable of switching the direction of the coil current, thereby allowing the driving power to be switched between the positive direction and the negative direction.

With applications required to have a small size, in some cases, such an arrangement employs a VCM having a spring return mechanism. A VCM having a spring return mechanism has a configuration in which the driving power in a first direction is generated by supplying a driving current to the coil, and the driving power in a second direction that is the reverse of the first direction is generated using the mechanical driving force generated by a spring attached to a mover. That is to say, such an arrangement uses both an electrical driving force and a mechanical driving force. In such an arrangement configured to drive such a VCM having a spring return mechanism, a driving current to be supplied to its coil is required to have only a single direction. Thus, such an arrangement provides a simplified driving circuit.

Miniaturization of electronic devices has involved an increased demand for providing a further miniaturized VCM having a spring return mechanism. With such a miniaturized VCM, the coil inductance becomes small, and the weight of its mover becomes small. This leads to a problem of oscillation (ringing) in the mover, i.e., the lens, due to the force generated by the spring.

RELATED ART DOCUMENTS

Patent Documents

[Patent Document 1]
  Japanese Patent Application Laid Open No. H09-298430
[Patent Document 2]
  Japanese Patent Application Laid Open No. 2008-113506
[Patent document 3]
  Japanese Patent Application Laid Open No. 2008-043171

A spring has its own resonance frequency. In order to suppress such ringing, a signal component that corresponds to the resonance frequency should be removed from a driving signal to be applied to the VCM, which is a known method. In order to provide such a function, with conventional techniques, a twin-T type analog RC filter (band removal filter), tuned such that the cutoff frequency matches the resonance frequency, is provided on a path for the driving signal. In this case, once such an RC filter has been configured, it is difficult to change the cutoff frequency of the filter. This leads to a difficulty in changing such a VCM having a spring return mechanism to be driven.

An arrangement employing a digital filter instead of such an analog filter has an advantage in that it is possible to change the cutoff frequency. However, such an arrangement employing a digital filter has a disadvantage of a large circuit scale.

SUMMARY OF THE INVENTION

The present invention has been made in order to solve such a problem. Accordingly, it is en exemplary purpose of an embodiment of the present invention to provide a control technique for controlling oscillation in a VCM having a spring return mechanism.

An embodiment of the present invention relates to a driving circuit configured to drive a voice coil motor having a spring return mechanism. The driving circuit comprises: a driving current generating unit configured to supply a driving current that corresponds to an analog control signal to a coil of the voice coil motor; memory configured to store digital waveform data which indicates a time waveform of the driving current, from the frequency components of which a predetermined frequency component has been removed; a control unit configured to read out the waveform data from the memory at a rate that corresponds to the resonance frequency of the voice coil motor, and to output the waveform data thus read out as a digital code; and a D/A converter configured to convert the digital code output from the control unit into an analog control signal, and to output the analog control signal thus converted to the driving current generating unit.

With such an embodiment, the waveform data from which a predetermined frequency component has been removed is read out at a rate determined such that the predetermined frequency matches the resonance frequency of the voice coil motor, and thus such an arrangement is capable of suppressing ringing in the voice coil motor. Such an embodiment requires that only the readout rate be changed even if the resonance frequency of the voice coil motor changes. Thus, such an embodiment provides improvement in the range of use of the driving circuit. Furthermore, such an embodiment provides a reduced circuit scale as compared with an arrangement employing a digital filter.

Also, the waveform data may be normalized with respect to the full scale of the D/A converter. Also, the control unit may be configured to generate the digital code by multiplying the waveform data by a coefficient that corresponds to a target displacement of a mover. With such an arrangement, there is no need to prepare the waveform data for each displacement. Thus, with such an arrangement, the memory capacity can be reduced, or otherwise conserved.

Also, the memory may store first waveform data obtained by removing the predetermined frequency component from a step waveform that changes from zero to the target displacement.

Also, the memory may store second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time.

By employing such second waveform data, such an arrangement is capable of displacing the mover to the target coordinates in a short period of time.

Also, the memory may be configured to store: first waveform data obtained by removing the predetermined frequency component from a step waveform that changes from zero to the target displacement; second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time. Also, the control unit may be configured to be capable of selectively reading out either the first waveform data or the second waveform data.

Also, the control unit may be configured such that, when the current digital code, i.e., the last value set in the immediately preceding step, is smaller than a predetermined first threshold value, it first outputs a digital code that corresponds to the first threshold value, it then increments, with a constant slope, the value of the digital code, from the first threshold value up to a second threshold value that is greater than the first threshold value, following which it generates a digital code for the displacement from the second threshold value to a target displacement.

By setting the first and second threshold values to respective suitable values, such an arrangement is capable of suppressing ringing.

Another embodiment of the present invention relates to a lens module. The lens module comprises: a focusing lens; a voice coil motor having a return mechanism having a mover linked to the focusing lens; and a driving circuit according to any one of the aforementioned embodiments, configured to drive the voice coil motor.

Such an embodiment is capable of suppressing oscillation in the focusing lens. Thus, such an embodiment provides a stable image.

Yet another embodiment of the present invention relates to an electronic device. The electronic device comprises the aforementioned lens module, and an image sensing device configured to acquire an image from light that passes through the lens module.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a waveform diagram which shows the operation of a lens module shown in FIG. 1.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
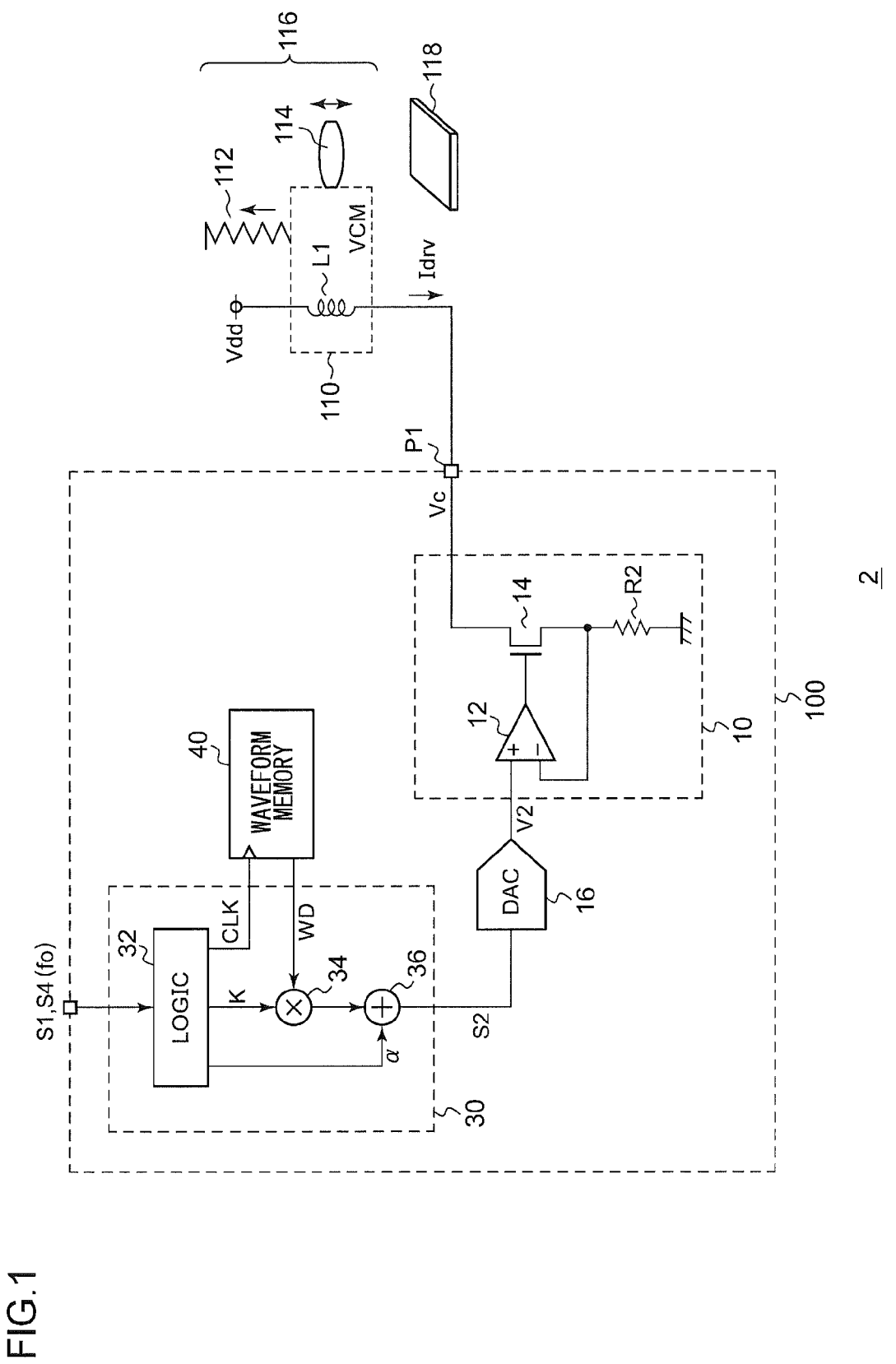
FIG. 1 is a circuit diagram which shows a configuration of a driving circuit according to an embodiment.

FIG. 1 is a circuit diagram which shows a configuration of a driving circuit 100 according to an embodiment. FIG. 1 shows an overall configuration of an electronic device 2 including the driving circuit 100.

The electronic device 2 is configured as a cellular phone having an image acquisition function, a digital still camera, a video camera, or the like, and includes a lens module 116 and an image sensing device 118. The lens module 116 includes a focusing lens 114, a voice coil motor 110, and a driving circuit 100.

The voice coil motor 110 is an actuator configured to perform positioning of the focusing lens 114, and is arranged such that its mover is linked to the focusing lens 114. The voice coil motor 110 has a return spring mechanism configured such that its mover is linked to the spring 112. The image sensing device 118 is a CCD or a CMOS sensor, and is configured to acquire an image from light that passes through the focusing lens 114.

The driving circuit 100 supplies a driving current Idrv to a coil L1 included in the voice coil motor 110 so as to control the position of the lens 114. Specifically, the driving circuit 100 is configured to displace the mover along a first direction by means of the driving current Idrv flowing through the voice coil motor 110. The spring 112 is configured to function such that it restores the mover to its former position along a second direction that is the reverse of the first direction.

The above is the overall configuration of the electronic device 2. Next, description will be made regarding the configuration of the driving circuit 100.

The driving circuit 100 includes a driving terminal P1, a driving current generating unit 10, a D/A converter 16, a control unit 30, and waveform memory 40.

The driving terminal P1 is connected to one terminal of the coil L1. The other terminal of the coil L1 is connected to a fixed voltage terminal (e.g., power supply terminal Vdd). In a case in which the driving circuit 100 operates receiving a negative power supply, the fixed voltage terminal may be configured as a ground terminal. The driving circuit 100 shown in FIG. 1 is configured as a sink circuit configured to draw the driving current from the coil L1. Also, the driving circuit 100 may be configured as a source circuit configured to supply the driving current Idrv to the coil L1, which can be readily conceived by those skilled in this art. With such a driving circuit configured as a source circuit, the aforementioned other terminal of the coil L1 is connected to the ground terminal.

The driving current generating unit 10 supplies the driving current Idrv that corresponds to an analog control signal V2 to the coil L1 of the voice coil motor 110. For example, the driving current generating unit 10 includes an operational amplifier 12, a transistor 14, and a resistor R2.

The transistor 14 and the resistor R2 are arranged in series between the driving terminal P1 and the fixed voltage terminal (ground terminal), i.e., on a path of the driving current Idrv that flows through the coil L1. The voltage that develops at a connection node that connects the transistor 14 and the resistor R2 is fed back to the inverting input terminal of the operational amplifier 12. The analog control signal V2 is input to the non-inverting input terminal of the operational amplifier 12. The driving current Idrv generated by the driving current generating unit 10 is represented by the following Expression.

$$Idrv=V2/R2$$

Figure 2A:
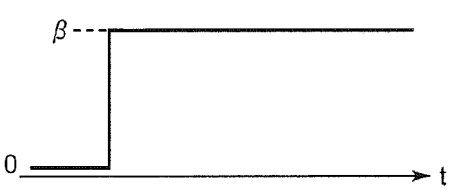
FIGS. 2A through 2F are diagrams showing a method for generating the waveform data WD.

The waveform memory 40 is configured to store digital waveform data WD that represents the time waveform of the driving current Idrv that flows through the voice coil motor 110. A predetermined frequency component is removed from the waveform data WD. The waveform data WD is generated by a computer beforehand. FIGS. 2A through 2F are graphs for describing a method for generating the waveform data WD. FIG. 2A shows the time waveform of the driving current Idrv having the predetermined frequency component. FIG. 2A shows a step waveform, as an example of the time waveform based on which the waveform data WD is generated.

Figure 2F:
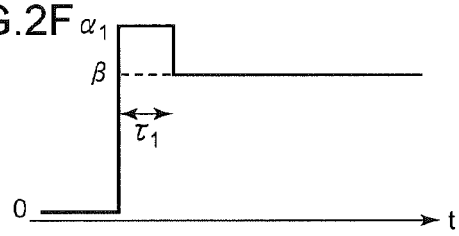
Figure 2B:
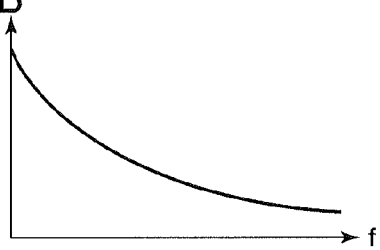
Figure 2C:
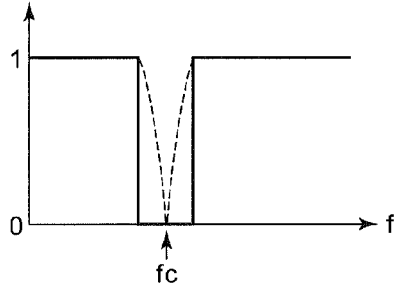

FIG. 2B shows a spectrum obtained by performing a Fourier transform on the time waveform shown in FIG. 2A. FIG. 2C is a graph which shows the frequency response characteristics of a filter configured to remove a predetermined frequency fc. The predetermined frequency fc is set according to a hypothetical resonance frequency which the voice coil motor 110 is predicted to have, e.g., 100 Hz. In FIG. 2C, the rectangular frequency response characteristics of the filter are indicated by the solid line, i.e., zero (−∞ dB) band pass characteristics are provided over a predetermined bandwidth BW with a predetermined frequency fc as the center. The bandwidth BW has a range of ±20 Hz with the frequency fc as the center, for example.

A filter having a Q value as indicated by the broken line may be employed, instead of such a filter having such a rectangular frequency response. Also, a different filter having different frequency response characteristics may be employed. Also, an arrangement may be made configured to generate multiple spectrums using multiple filters having different kinds of frequency response characteristics, and to generate the waveform data WD for each spectrum.

Figure 2D:
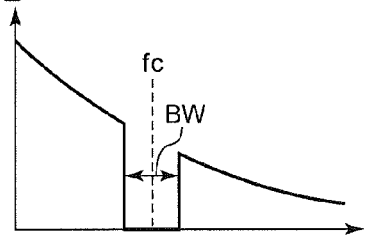

FIG. 2D shows a spectrum obtained by removing the predetermined frequency component fc from the spectrum shown in FIG. 2B by means of a filter having the filter characteristics shown in FIG. 2C.

Figure 2E:
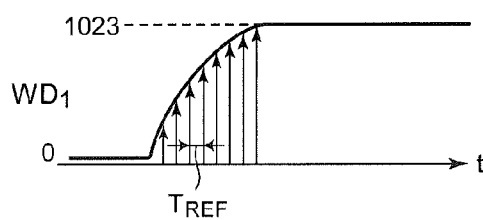

FIG. 2E shows a waveform having a time dimension obtained by performing an inverse Fourier transform on the spectrum shown in FIG. 2D. The waveform memory 40 stores the waveform data $WD_1$ obtained by sampling the time waveform shown in FIG. 2E. The sampling is performed at a reference rate ($T_{REF}$=2 ms). The waveform data $WD_1$ is defined by normalizing the data with respect to the full scale of the D/A converter 16. For example, in a case in which the D/A converter 16 has a 10-bit full scale, the first waveform data $WD_1$ is represented with $2^{10}$=1024 levels.

It is needless to say that various kinds of waveforms other than such a step function waveform may be employed as such a time waveform used as a base waveform, which can be readily conceived by those skilled in this art. For example, the time waveform as shown in FIG. 2F may be employed instead of the waveform shown in FIG. 2A. The waveform shown in FIG. 2F is obtained by superimposing an acceleration pulse on the waveform shown in FIG. 2A. The time waveform changes in a stepwise manner from zero to a first displacement $\alpha_1$ that is greater than a target level β. Subsequently, the time waveform is maintained at the first displacement $\alpha_1$ for a predetermined period of time $\tau_1$, following which the time waveform changes in a stepwise manner to the target level β. The second waveform data $WD_2$ may be generated by removing the predetermined frequency component fc from the waveform shown in FIG. 2F.

There can be cases in which the Q value of resonance in the voice coil motor 110 is large, and cases in which the Q value is small are also possible. Thus, by providing variations of the waveform shown in FIG. 2F, an arrangement is capable of appropriately driving the voice coil motor 110 having various kinds of Q values. Specifically, in a case in which the Q value is large, i.e., the oscillation does not readily decay, such an arrangement may employ the waveform data generated based upon the waveform $WD_1$ generated based upon the waveform shown in FIG. 2A, and in a case in which the Q value is small, i.e., in a case in which the oscillation readily decays, such an arrangement may employ the waveform data $WD_2$ generated based upon the waveform shown in FIG. 2F.

Also, the waveform memory 40 may store multiple waveform data WD that are respectively generated based upon different base time waveforms. Also, the control unit 30 may be configured to selectively read out one from among the multiple waveform data WD.

Returning to FIG. 1, the control unit 30 receives, as input data, data S4 which indicates the resonance frequency $f_0$ of the voice coil motor 110. Such an arrangement is configured to be capable of setting the resonance frequency $f_0$ in 5-Hz steps, for example. The control unit 30 reads out the waveform data WD from the waveform memory 40 at a rate that corresponds to the resonance frequency $f_0$, and outputs the waveform data WD thus read out as a digital code S2. For example, when the resonance frequency $f_0$ matches the hypothetical resonance frequency (fc=100 Hz), the readout rate $T_{READ}$ is set to the reference rate $T_{REF}$=2 ms.

The readout rate $T_{READ}$ is represented by the following Expression using a desired resonance frequency $f_0$.

$$T_{READ}=T_{REF} \times fc/f_0$$

Specifically, when $f_0$=50 Hz, the readout rate $T_{READ}$ is set to 4 ms, and when $f_0$=150 Hz, the readout rate $T_{READ}$ is set to 4/3 ms. The logic unit 32 of the control unit 30 calculates the readout rate $T_{READ}$ based upon the data S4, and outputs the readout rate $T_{READ}$ thus calculated to the waveform memory 40.

The control unit 30 includes the logic unit 32, a multiplier 34, and an adder 36. The control unit 30 receives, as an input value, an instruction value S1 which indicates the target stroke amount, i.e., the target coordinate point β of the focusing lens 114. The control unit 30 adjusts the amplitude of the waveform data WD by multiplying the waveform data WD read out from the waveform memory 40 by a coefficient K that corresponds to the target displacement ΔX of the mover. The displacement ΔX is represented by the difference between the current target coordinate point α (digital code set in the immediately preceding step) of the mover and the value β indicated by the instruction value S1. The coefficient K is represented by the following Expression using the full scale FS (=1024).

$$K=\Delta X/FS$$

The logic unit 32 calculates the displacement ΔX based upon the instruction value S1, and calculates the coefficient K. The multiplier 34 multiplies the waveform data WD by the coefficient K so as to generate the waveform data WD' having an adjusted amplitude. The adder 36 calculates the sum of the initial value α of the coordinate point of the mover and the waveform data WD' so as to output the digital code S2.

The D/A converter 16 converts the digital code S2 output from the control unit 30 into the analog control signal V2, and outputs the analog control signal V2 thus converted to the driving current generating unit 10.

The above is the configuration of the driving circuit 100. Next, description will be made regarding the operation thereof. FIG. 3 is a waveform diagram showing the operation of the lens module 116 shown in FIG. 1.

Let us say that, in the initial state (t<t0), the mover is stationary at the coordinate point α. Furthermore, the control unit 30 receives beforehand, as input data, the data S4 that indicates the resonance frequency $f_0$ of the voice coil motor 110. The logic unit 32 sets the readout rate $T_{READ}$ according to the data S4.

Let us say that, at the time point to, the instruction value S1 that indicates the target coordinate point β is input. The logic unit 32 calculates the displacement ΔX=β−α, and calculates the coefficient K that corresponds to the displacement ΔX. Next, the logic unit 32 reads out the waveform data WD from the waveform memory 40 at the rate $T_{READ}$ that corresponds to the resonance frequency $f_0$. With such an arrangement, the waveform data WD thus read out matches the data obtained by removing the resonance frequency $f_0$ from the waveform data. The multiplier 34 multiplies the waveform data WD by the coefficient K so as to generate waveform data WD' having an adjusted amplitude. The adder 36 generates the sum of the waveform data WD' and the initial coordinate point α so as to generate the digital code S2.

The coil L1 is supplied with the driving current Idrv, which is proportional to the digital code S2. The coordinate point X of the mover changes according to the driving current Idrv. The above is the operation of the lens module 116. As a comparison, the broken line indicates the coordinate point X of the mover when the instruction value S1 is directly input to the D/A converter 16.

With the driving circuit 100 according to the embodiment, by adjusting the waveform data WD readout rate $T_{READ}$ according to the resonance frequency $f_0$, such an arrangement is capable of removing the resonance frequency $f_0$ from the frequency components of the driving current Idrv. As a result, such an arrangement is capable of changing the coordinate point X of the mover to the target coordinate point β while suppressing oscillation in the coordinate point of the mover.

The driving circuit 100 has the following advantage, in addition to the advantage of suppressing ringing.

The resonance frequency of a voice coil motor having a spring return mechanism is determined by the spring constant of the spring 112 or the inductance of the coil L1. Accordingly, in some cases, the resonance frequency $f_0$ is often changed in the design stage of the electronic device 2. In a case in which a twin-T analog RC filter (band removal filter) is employed, as it is with conventional techniques, there is a need to change the resistance and the capacitance of the filter according to the resonance frequency. In contrast, with the driving circuit 100 shown in FIG. 1, there is no need to change the design of the driving circuit 100 itself. Instead, such an arrangement only requires that the data S4 that indicates the resonance frequency $f_0$ be changed. Thus, such an arrangement provides a dramatic improvement in the range of use of the driving circuit 100.

Furthermore, the driving circuit 100 has a small circuit area as compared with an arrangement employing a digital filter, which is also an advantage. Furthermore, there are no limitations on the filter frequency characteristics of the driving circuit 100, which is also an advantage. In a case in which an analog filter or a digital filter is employed, there are limitations on the filter response characteristics in such an arrangement, i.e., the filter order, the Q value, and the removal bandwidth. In contrast, the driving circuit 100 generates the waveform data WD beforehand by computation using a computer. Thus, such an arrangement allows the filter characteristics to be freely designed.

Furthermore, there can be cases in which the Q value of resonance in the voice coil motor 110 is large, and cases in which the Q value is small are also possible. Accordingly, by preparing multiple patterns of waveform data generated using filter characteristics (Q values) that differ from that shown in FIG. 2C, such an arrangement allows the driving-target voice coil motor 110 to be driven using waveform data WD that is suitable for it.

Figure 4A:
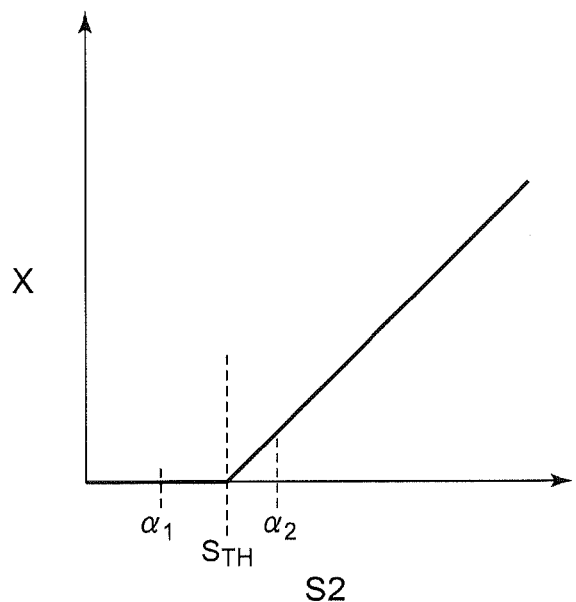
FIG. 4A is a graph which shows the relation between a digital code and the coordinate point of a mover.

FIG. 4A is a graph showing the relation between the digital code and the coordinate point X of the mover. When the digital code S2 is smaller than a predetermined threshold value $S_{TH}$, the focusing lens 114 is in contact with the mechanism end, and the displacement X is set to zero. When the digital code S2 becomes greater than the threshold value $S_{TH}$, the displacement X is increased according to the digital code S2.

Such an operation shown in the operation waveform diagram in FIG. 3 requires that, in the initial state, the focusing lens 114 be in a floating state with respect to the mechanism end. That is to say, such an arrangement requires that the initial coordinate point α be greater than the threshold value $S_{TH}$. In other words, in a case in which the driving operation starts with the focusing lens 114 being in contact with the mechanism end according to the waveform data WD, such an arrangement does not provide the displacement of the mover desired by the user.

Figure 4B:
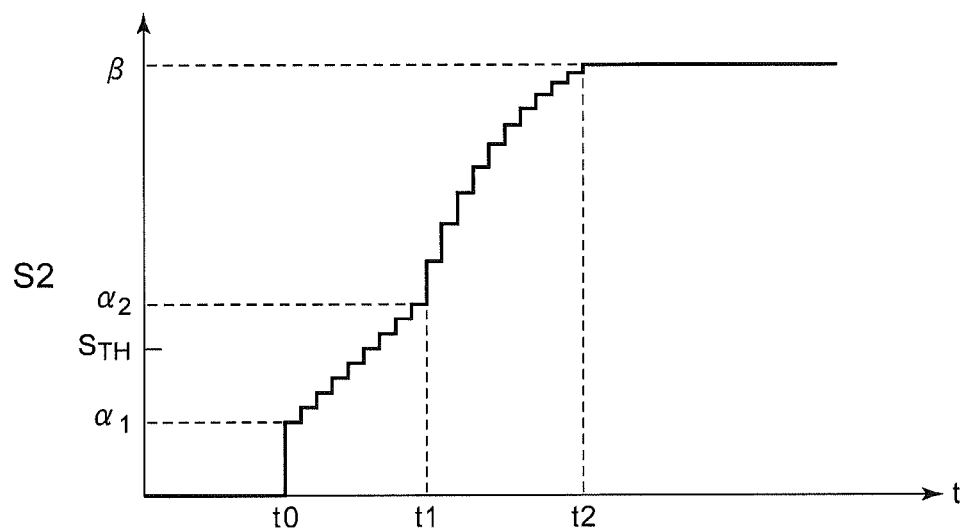
FIG. 4B is a graph which shows the waveform of the digital code when the mover is to be displaced starting from the state in which the focusing lens is in contact with the mechanism end.

In order to solve such a problem, when the digital code (current value) starts with a value that is smaller than a first threshold value $α_1$, e.g., zero, before the driving operation, the control unit 30 operates according to the following flow. FIG. 4B is a graph showing the waveform of the digital code S2 when the position of the mover is changed, starting with a state in which the focusing lens 114 is in contact with the mechanism end.

1. When the instruction signal S1 is input at the time point to, the control unit 30 outputs the digital code S2 that indicates the first threshold value $α_1$ that is smaller than the threshold value $S_{TH}$ (direct mode). The first threshold value $α_1$ is determined such that it is in a range that ensures that the focusing lens 114 is in contact with the mechanism end.

2. Next, the control unit 30 increments the digital code S2 with a constant slope from the first threshold value $α_1$ to the second threshold value $α_2$ that is greater than first threshold value $α_1$ the over a period from the time point t0 to the time point t1 (stepwise mode). The second threshold value $α_2$ is determined such that it is in a range that ensures that the focusing lens 114 is in a floating state.

3. After the time point t1, the digital code is generated until it matches the target displacement β according to the waveform data WD, with the second threshold value $α_2$ as the initial value α.

With such a driving method, such an arrangement provides displacement of the mover while suppressing ringing even if the driving operation starts from the state in which the focusing lens 114 is in contact with the mechanism end.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding the actuator for the focusing lens as an application of the voice coil motor. However, the present invention is not restricted to such an arrangement. Rather, the present invention can be effectively applied to various kinds of applications such as an actuator for a printer head.

The instruction value S1 may be a value that indicates relative displacement with respect to the current coordinate point of the mover. In this case, the instruction value S1 matches the displacement ΔX.

While the preferred embodiments of the present invention have been described using specific terms, such description is for illustrative purposes only, and it is to be understood that changes and variations may be made without departing from the spirit or scope of the appended claims.

What is claimed is:

1. A driving circuit configured to drive a voice coil motor having a spring return mechanism, the driving circuit comprising:
   a driving current generating unit configured to supply a driving current that corresponds to an analog control signal to a coil of the voice coil motor;
   memory configured to store digital waveform data which indicates a time waveform of the driving current, from the frequency components of which a predetermined frequency component has been removed;
   a control unit configured to read out the waveform data from the memory at a rate that corresponds to the resonance frequency of the voice coil motor, and to output the waveform data thus read out as a digital code; and
   a D/A converter configured to convert the digital code output from the control unit into an analog control signal, and to output the analog control signal thus converted to the driving current generating unit, wherein the memory is configured to store:
   first waveform data obtained by removing the predetermined frequency component from a step waveform that changes from zero to the target displacement;
   second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time,
   and wherein the control unit is configured to be capable of selectively reading out either the first waveform data or the second waveform data.

2. A driving circuit according to claim 1, wherein the waveform data is normalized with respect to the full scale of the D/A converter,
   and wherein the control unit is configured to generate the digital code by multiplying the waveform data by a coefficient that corresponds to a target displacement of a mover.

3. A driving circuit according to claim 1, wherein the control unit is configured such that, when the digital code that has been set is smaller than a predetermined first threshold value, it first outputs a digital code that corresponds to the first threshold value, it then increments, with a constant slope, the value of the digital code, from the first threshold value up to a second threshold value that is greater than the first threshold value, following which it generates a digital code for the displacement from the second threshold value to a target displacement.

4. A driving circuit according to claim 1, wherein the control unit is configured to calculate a target displacement by subtracting the current coordinate point from a target coordinate point of a mover,
   and wherein the control unit is configured to generate the digital code by calculating the sum of the current coordinate point and data obtained by multiplying the waveform data by the target displacement.

5. A lens module comprising:
   a focusing lens;
   a voice coil motor having a return mechanism arranged such that its mover is linked to the focusing lens;
   a driving circuit configured to drive the voice coil motor,
   wherein the driving circuit comprises:
   a driving current generating unit configured to supply a driving current that corresponds to an analog control signal to a coil of the voice coil motor;
   memory configured to store digital waveform data which indicates a time waveform of the driving current, from the frequency components of which a predetermined frequency component has been removed;
   a control unit configured to read out the waveform data from the memory at a rate that corresponds to the resonance frequency of the voice coil motor, and to output the waveform data thus read out as a digital code; and
   a D/A converter configured to convert the digital code output from the control unit into an analog control signal, and to output the analog control signal thus converted to the driving current generating unit,
   wherein the memory is configured to store:
   first waveform data obtained by removing the predetermined frequency component from a step waveform that changes from zero to the target displacement;
   second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time,
   and wherein the control unit is configured to be capable of selectively reading out either the first waveform data or the second waveform data.

6. An electronic device comprising:
   a lens module; and
   an image sensing device configured to acquire an image from light that passes through the lens module,
   wherein the lens module comprises:
   a focusing lens;
   a voice coil motor having a return mechanism arranged such that its mover is linked to the focusing lens;
   a driving circuit configured to drive the voice coil motor,
   and wherein the driving circuit comprises:
   a driving current generating unit configured to supply a driving current that corresponds to an analog control signal to a coil of the voice coil motor;
   memory configured to store digital waveform data which indicates a time waveform of the driving current, from the frequency components of which a predetermined frequency component has been removed;
a control unit configured to read out the waveform data from the memory at a rate that corresponds to the resonance frequency of the voice coil motor, and to output the waveform data thus read out as a digital code; and
a D/A converter configured to convert the digital code output from the control unit into an analog control signal, and to output the analog control signal thus converted to the driving current generating unit, wherein the memory is configured to store:
first waveform data obtained by removing the predetermined frequency component from a step waveform that changes from zero to the target displacement;
second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time,
and wherein the control unit is configured to be capable of selectively reading out either the first waveform data or the second waveform data.

7. A driving circuit configured to drive a voice coil motor having a spring return mechanism, the driving circuit comprising:
a driving current generating unit configured to supply a driving current that corresponds to an analog control signal to a coil of the voice coil motor;
memory configured to store digital waveform data which indicates a time waveform of the driving current, from the frequency components of which a predetermined frequency component has been removed;
a control unit configured to read out the waveform data from the memory at a rate that corresponds to the resonance frequency of the voice coil motor, and to output the waveform data thus read out as a digital code; and
a D/A converter configured to convert the digital code output from the control unit into an analog control signal, and to output the analog control signal thus converted to the driving current generating unit, wherein the control unit is configured such that, when the digital code that has been set is smaller than a predetermined first threshold value, it first outputs a digital code that corresponds to the first threshold value, it then increments, with a constant slope, the value of the digital code, from the first threshold value up to a second threshold value that is greater than the first threshold value, following which it generates a digital code for the displacement from the second threshold value to a target displacement.

8. A driving circuit according to claim 7, wherein the waveform data is normalized with respect to the full scale of the D/A converter,
and wherein the control unit is configured to generate the digital code by multiplying the waveform data by a coefficient that corresponds to a target displacement of a mover.

9. A driving circuit according to claim 7, wherein the memory stores first waveform data obtained by removing the predetermined frequency component from a step waveform that changes from zero to the target displacement.

10. A driving circuit according to claim 7, wherein the memory stores second waveform data obtained by removing the predetermined frequency component from a waveform that changes in a stepwise manner from zero to a first displacement that is greater than a target displacement, and that changes in a stepwise manner to the target displacement after the first displacement is maintained for a predetermined period of time.

11. A driving circuit according to claim 7, wherein the control unit is configured to calculate a target displacement by subtracting the current coordinate point from a target coordinate point of a mover,
and wherein the control unit is configured to generate the digital code by calculating the sum of the current coordinate point and data obtained by multiplying the waveform data by the target displacement.

12. A lens module comprising:
a focusing lens;
a voice coil motor having a return mechanism arranged such that its mover is linked to the focusing lens;
a driving circuit configured to drive the voice coil motor, wherein the driving circuit comprises:
a driving current generating unit configured to supply a driving current that corresponds to an analog control signal to a coil of the voice coil motor;
memory configured to store digital waveform data which indicates a time waveform of the driving current, from the frequency components of which a predetermined frequency component has been removed;
a control unit configured to read out the waveform data from the memory at a rate that corresponds to the resonance frequency of the voice coil motor, and to output the waveform data thus read out as a digital code; and
a D/A converter configured to convert the digital code output from the control unit into an analog control signal, and to output the analog control signal thus converted to the driving current generating unit, wherein the control unit is configured such that, when the digital code that has been set is smaller than a predetermined first threshold value, it first outputs a digital code that corresponds to the first threshold value, it then increments, with a constant slope, the value of the digital code, from the first threshold value up to a second threshold value that is greater than the first threshold value, following which it generates a digital code for the displacement from the second threshold value to a target displacement.

13. An electronic device comprising:
a lens module; and
an image sensing device configured to acquire an image from light that passes through the lens module,
wherein the lens module comprises:
a focusing lens;
a voice coil motor having a return mechanism arranged such that its mover is linked to the focusing lens;
a driving circuit configured to drive the voice coil motor, and wherein the driving circuit comprises:
a driving current generating unit configured to supply a driving current that corresponds to an analog control signal to a coil of the voice coil motor;
memory configured to store digital waveform data which indicates a time waveform of the driving current, from the frequency components of which a predetermined frequency component has been removed;
a control unit configured to read out the waveform data from the memory at a rate that corresponds to the resonance frequency of the voice coil motor, and to output the waveform data thus read out as a digital code; and a D/A converter configured to convert the digital code output from the control unit into an analog control signal, and to output the analog control signal thus converted to the driving current generating unit, wherein the control unit is configured such that, when the digital code that has been set is smaller than a predetermined first threshold value, it first outputs a digital code that corresponds to the first threshold value, it then increments, with a constant slope, the value of the digital code, from the first threshold value up to a second threshold value that is greater than the first threshold value, following which it generates a digital code for the displacement from the second threshold value to a target displacement.

* * * * *